United States Patent [19]

Meyer

[11] Patent Number: 4,606,378

[45] Date of Patent: Aug. 19, 1986

[54] WEIGHTCOATED SUBSEA PIPELINE SECTION

[76] Inventor: Erik B. Meyer, Liederen 16, N-4950 Risor, Norway

[21] Appl. No.: 746,929

[22] PCT Filed: Apr. 2, 1982

[86] PCT No.: PCT/NO82/00017

§ 371 Date: Nov. 30, 1982

§ 102(e) Date: Nov. 30, 1982

[87] PCT Pub. No.: WO82/03438

PCT Pub. Date: Oct. 14, 1982

Related U.S. Application Data

[63] Continuation of Ser. No. 451,205, Nov. 30, 1982, abandoned.

[30] Foreign Application Priority Data

Apr. 7, 1981 [NO] Norway .................................. 811189
Mar. 12, 1982 [NO] Norway .................................. 820812

[51] Int. Cl.[4] .............................................. F16L 1/04
[52] U.S. Cl. .................................... 138/103; 138/145; 138/174; 138/178; 405/171
[58] Field of Search .............. 138/103, 172, 175, 177, 138/174, 178, 137, 140, 145; 405/158, 171, 172

[56] References Cited

U.S. PATENT DOCUMENTS

| | | | |
|---|---|---|---|
| 1,544,592 | 7/1925 | Murray | 138/175 |
| 3,267,969 | 8/1966 | Mallard | 138/178 |
| 4,198,450 | 4/1980 | Hooykaas | 138/103 X |
| 4,338,044 | 7/1982 | Titus | 405/172 |
| 4,395,159 | 7/1983 | Karuks et al. | 405/172 |
| 4,437,495 | 3/1984 | Zonsveld | 138/144 |

FOREIGN PATENT DOCUMENTS

| | | | |
|---|---|---|---|
| 1276468 | 6/1972 | United Kingdom | 138/103 |
| 1463743 | 2/1977 | United Kingdom | 405/172 |
| 1573814 | 8/1980 | United Kingdom . | |

*Primary Examiner*—James E. Bryant, III
*Attorney, Agent, or Firm*—Wenderoth, Lind & Ponack

[57] ABSTRACT

Subsea pipe line sections adapted to be welded together into a continuous subsea pipe line are provided with a weight coating which, apart from its weighting function, also serves to protect the pipes. The weight coating comprises a composite material substantially consisting of a granulated iron ore in a matrix of a thermosetting resin, covered by a high strength durable plastic tube.

5 Claims, 4 Drawing Figures

WEIGHTCOATED SUBSEA PIPELINE SECTION

This application is a continuation of now abandoned application Ser. No. 451,205, filed Nov. 30, 1982.

BACKGROUND OF THE INVENTION

The present invention relates to subsea pipe lines for conveying fluids such as petroleum from an offshore wellhead. Such pipe lines are generally made up of steel pipe provided with a continuous weight coating, which in addition to its weighting function also serves to protect the steel pipe against corrosion and mechanical strains.

Conventional weight coating for subsea pipe lines typically consists of a casing of reinforced concrete surrounding a fibre-glass reinforced bituminous compound on the external surface of the steel pipe.

A problem encountered with such conventional weight coating is that cracks tend to develop in the brittle concrete casing owing to shocks and stresses during pipe transport and laying operations, resulting in pieces of concrete flaking off. Since in addition the inner bituminous coating has a rather poor adherence to the steel pipe surface, smaller or larger areas of the latter will be exposed to the sea water and consequently subjected to heavy corrosion.

SUMMARY OF THE INVENTION

The present invention provides a subsea pipe line section comprising a steel pipe provided with a continuous weight coating in the form of a relatively thick layer of a composite material consisting of granules of a relatively heavy material embedded in a plastic matrix, said composite material covered by a high strength, durable plastic tube.

The weight coating according to the invention eliminates the problem of the conventional concrete casing, since the plastic matrix effectively bends to the surface of the steel pipe, particularly if a corrosion resistant primer such as a bituminous epoxy resin has been applied to the steel surface prior to the plastic matrix. Moreover, the weight coating according to the invention, in contrast to the conventional concrete casing, is elastic and practically non-absorbent, thus providing a strong, ductile and impenetrable seal on the steel pipe surface. The smooth and hard outer surface of the new weight coating according to the invention also effectively solves the increasing problem of fishing equipment getting entangled on broken parts and reinforcing rods of concrete weight coatings on prior art subsea pipe lines. A further advantage of the new weight coating is that it will be capable of preventing excessive discharge of oil in case of a leakage occurring in the steel pipe, since the combined plastic tube and composite material has been found to withstand a pressure as high as 20 atm.

The weight coating according to the invention is primarily intended to be applied as an external casing on the steel pipe. However, if desired it may as well be applied as a lining on the internal surface of the steel pipe to protect it against corrosive fluids flowing therethrough.

The plastic matrix will preferably consist of a thermosetting resin such as epoxy, polyurethane or acrylic resin, while the heavy material embedded in the plastic resin preferably consists of a heavy metal ore, e.g. an iron ore such as magnetite, hematite or the like, in the form of particles or granules.

BRIEF DESCRIPTION OF THE DRAWINGS

Non-limiting examples of subsea weight coated pipe according to the invention will be explained in detail below with reference to the drawings in which.

DETAILED DESCRIPTION OF THE INVENTION

Figure 1:
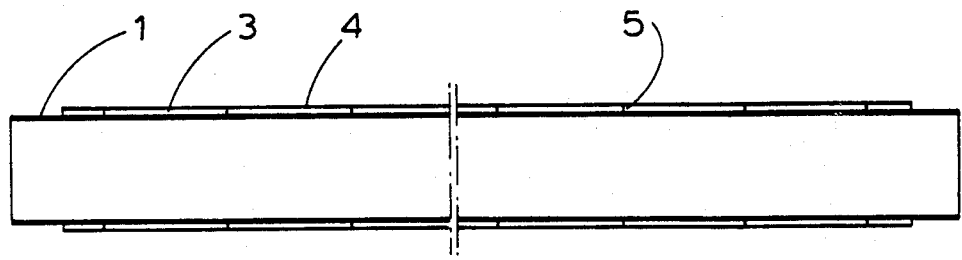
FIG. 1 is a longitudinal sectional view of a pipe line section according to the invention provided with an external weight coating.

Referring to FIG. 1 the numeral 1 is a steel pipe provided with the protective weight coating according to the invention applied as an external casing on the pipe. This casing comprises a plastic tube 4 surrounding a relatively thick layer 3 of a composite material consisting of a plastic matrix, preferably a thermosetting resin such as epoxy, polyurethane or acrylic resin, in which are embedded particles or granules of a heavy material, e.g. an iron ore such as magnetite, hematite or the like.

Favourable results have been obtained using a composit material consisting of 85–95 percent by weight of magnetite in a matrix of 5–15 percent by weight of epoxy resin. In order to enhance strength and elongation properties a certain amount of fibre glass may be added to the resin. The matrix resin may of course also include any other desired additive such as a filler, accelerator, retarder, etc.

Thus, a composite material 3 consisting of 90% magnetite in a matrix of epoxy resin will provide a weight coating having a specific gravity of about 2.8 g/cm$^3$, compared to a conventional concrete weight coating which has a specific gravity of about 2.2 g/cm$^3$.

The outer plastic tube 4 is preferably made from a plastic material capable of withstanding severe mechanical stresses caused by impact, shock, tension and compression. A preferred material for the plastic tube 4 is cross-linked polyethylene which is also a highly durable material.

The internal surface of the outer tube 4 is preferably provided with spaced, radially inwardly directed lugs or protrusions 5 which serve to centre the outer tube coaxially on the steel pipe 1 with a radial spacing adjusted to the desired thickness of the composite layer 3. The lugs 5 also serve to anchor the plastic tube 4 in the composite material 3 which in turn adheres to the external surface of the steel pipe 1 such that relative displacement between the steel pipe 1 and the plastic tube 4 is practically impossible.

The required thickness of the composite material 3 will depend on the conditions on the site where the pipe line is to be laid. Generally a thickness of between 1–4 cm will be satisfactory. Also the required thickness of the outer plastic tube 4 will depend on the site conditions, 3–20 mm being a typical range.

In order to achieve the best possible corrosion resistance together with an optimal bond between the steel pipe 1 and the composite material 3, the external surface of the steel pipe 1 in a preferred embodiment of the invention is coated with a thin, for example 0.3–0.5 mm film 2 of a bituminous epoxy resin.

The above described protective weight coating according to the invention is applied to the steel pipe 1 by pushing the steel pipe 1 into the outer tube 4 with the lugs 5 contacting the steel pipe surface which preferably has been sand blasted beforehand and coated with the bituminous epoxy film 2 which is allowed to set before inserting the pipe into the plastic tube, then injecting the non-hardened composite material 3 by per se known means into the annulus between the plastic tube 4 and the steel pipe 1 to completely fill this annulus, and allowing the composite material to harden into a rigid and at the same time elastic material having a strong bonding to the surface of the steel pipe.

Alternatively the ferriferous granules of the composite material 3 may be separately inserted into the annulus between the pipe 1 and tube 4 in a first step, and then in a second step the plastic matrix resin is injected as an easy-flowing composition into the annulus to fill up the void between the granules therein.

As shown in FIG. 1 the weight coating 3, 4 terminates somewhat short of the ends of the steel pipe 1, leaving exposed steel pipe end portions of say 10–40 cm. When joining such pipe sections to form a continuous pipe line the steel pipes are butt-welded together and the two preformed halves of an axially split socket sleeve (not shown) of the same materials and cross-sectional dimensions as the weight casing 3, 4 are placed together on the exposed end portions of the joined steel pipes. The sleeve-halves are sealingly and rigidly bonded to the adjacent steel pipe and weightcasing surfaces by injecting an epoxy resin to the socket sleeve inner surfaces which preferably are somewhat roughened or wafer-patterned.

Figure 2:
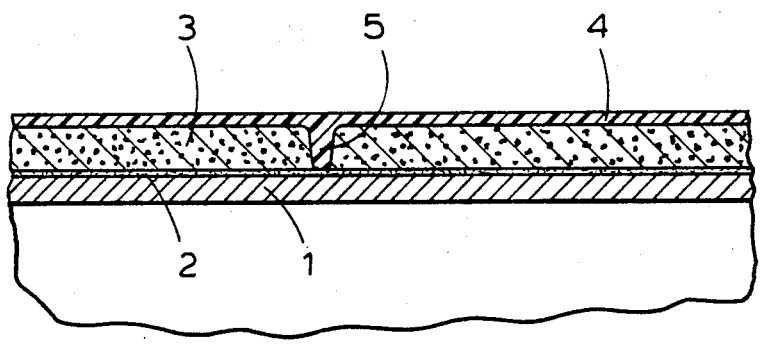
FIG. 2 is a partial enlarged view of the wall of the pipe shown in FIG. 1.
Figure 3:
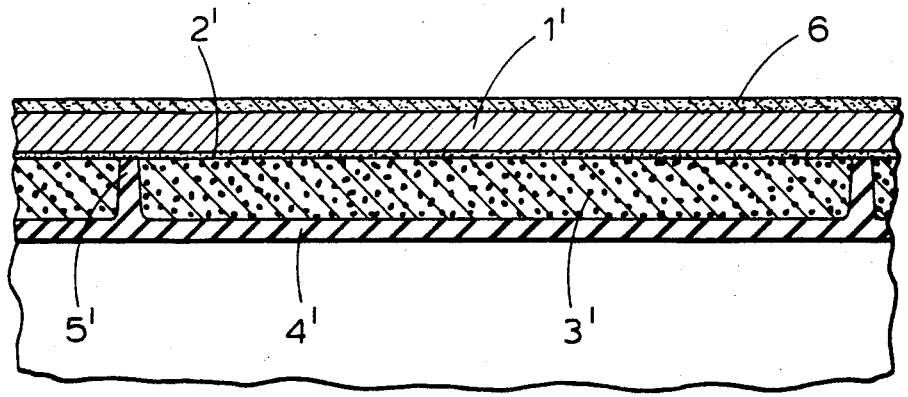
FIG. 3 is a partial, sectional view of the wall of a subsea pipe line section according to the invention provided with an internal weight coating.

FIG. 3 illustrates an embodiment of the invention in which the weight coating is applied as a lining on the internal surface of a steel pipe 1' instead of as an external casing as in the previous example. Thus, in FIG. 3 the numeral 2' is a primer for example of a bituminous epoxy resin, 3' is a relatively thick layer of the previously described heavy composite material, 4' is an inner plastic tube of similar material as the outer plastic tube 4 in the previous example. The plastic tube 4' has external, spaced lugs or protrusions 5' to centre and rigidly anchor the plastic tube coaxially in the steel pipe. The steel pipe 1' with the inner weight lining 3', 4' is also shown to have an outer corrosive-resistant coating 6 which may be a conventional coating such as a bituminous epoxy plastic material. Alternatively however, the external surface of the steel pipe 1' may be provided with a weight casing as described in the previous example shown in FIGS. 1 and 2, the desired unit weight of the total coating then being distributed between the outer casing and the inner lining.

The above described internal weight lining is applied to the steel pipe 1' substantially in the same manner as the external weight casing of the steel pipe 1 according to the previous example. That is, the plastic tube 4' is inserted into the steel pipe 1' with its lugs 5' engaging the internal surface of the steel pipe, preferably after the latter has been sand blasted and coated with a bituminous epoxy primer 2', the composite resin 3' is inserted into the annulus between the plastic tube 4' and steel pipe 1' and allowed to harden, or alternatively as before the ferronuous granules may be inserted separately into the annulus between the pipe and tube in a first step and the plastic matrix resin in a second step is injected into the annulus filled with granules.

As to the thicknesses of the respective individual layers 2', 3', 4' of the internal weight lining according to the invention, the same values apply as stated above for the external layers 2, 3, 4 in the previous case of the external weight casing. The inner diameter of the internal plastic tube 4' is determined by the desired cross-sectional through-flow area of the pipe line, and the nominal diameter of the steel pipe 1' is then determined on the basis of the desired thickness of the weight coating.

Figure 4:
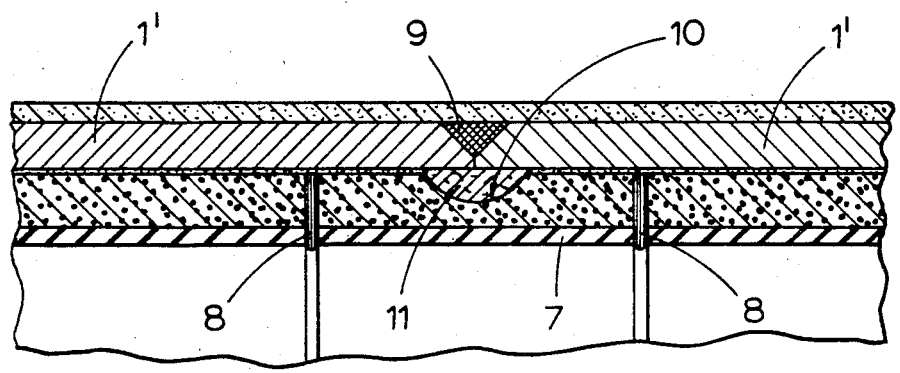
FIG. 4 is a portion view of end portions of two pipe line sections of the type illustrated in FIG. 3 at a welded junction thereof.

When butt-welding pipe sections with internal plastic weight lining of the above described type a problem will arise as heat from the welding operation may weaken the internal plastic lining in the welding areas. This problem may be solved in the following manner with reference to FIG. 4.

Like in the previous example of the external weight casing the internal weightlining is terminated 10–40 cm short of the ends of the steel pipe 1'. When the pipes are to be joined the two internally exposed steel pipe ends are moved by sliding onto a preformed lining sleeve 7 made of the same material and having the same cross-sectional dimensions as the pipe lining 3', 4', heat resistant seal rings 8, for example of an asbestos material, having first been placed against the end faces of the linings of the two pipe sections. The length of the lining sleeve is such that when the pipe sections are pushed fully against each other ready for welding, the seal rings 8 are in a compressed, fluidtight condition. The midportion of the sleeve 7, which will be situated directly opposite the weld seam 9 between the pipe section ends, is formed with a circumferential recess or groove 10 filled with a heat insulating and resisting material 11. for example burned clay or the like. Now the welding together of the ends of the two steel pipes 1 may be performed without any risk of weakening the internal plastic lining which thus will extend in a sealed and continuous manner at the pipe junction area.

Although at the present iron ore appears to be the most practical and economical material to be used as the weighting component of the composite material 3 or 3' of the weight coating according to the invention, it is within the scope of the invention to utilize other suitable materials of relatively large specific gravity, e.g. lead-, zinc- or titanium-containing minerals.

It will be appreciated that the use of weight coated pipe line sections as disclosed herein is not limited to pipe lines located entirely on the sea bottom. Thus, the pipe line sections advantageously may be used as a riser pipe extending from a subsea wellhead to a production platform or the like on the sea surface.

What I claim is:

1. In a subsea pipe line section of the type including a steel pipe covered with a continuous weight coating, the improvement wherein said weight coating comprises:

a relatively thick layer of a composite material consisting of from 85 to 95% by weight of granulated heavy metal ore bound and embedded in a matrix of an epoxy, polyester or acrylic thermosetting resin;

a protective sheathing in the form of a high strength, durable plastic tube covering said layer of composite material; and lugs integral with said tube and extending therefrom into said layer of composite material and thereby anchoring said tube to said layer.

2. The improvement claimed in claim 1, wherein said weight coating is in the form of an external casing on the outer surface of said steel pipe.

3. The improvement claimed in claim 1, wherein said weight coating is in the form of an internal lining on the inner surface of said steel pipe.

4. The improvement claimed in claim 1, wherein said weight coating is in the form of an external casing on the outer surface of said steel pipe and of an internal lining on the inner surface of said steel pipe.

5. The improvement claimed in claim 1, further comprising a coating of corrosion-resistant primer bonding said composite material to said steel pipe.

* * * * *